T. H. PIERSON.
METER.
APPLICATION FILED MAR. 31, 1916.

1,229,514.

Patented June 12, 1917.
4 SHEETS—SHEET 1.

Witnesses
H. H. Lybrand
John J. McCarthy

Inventor
Thomas H. Pierson
By Victor J. Evans
Attorney

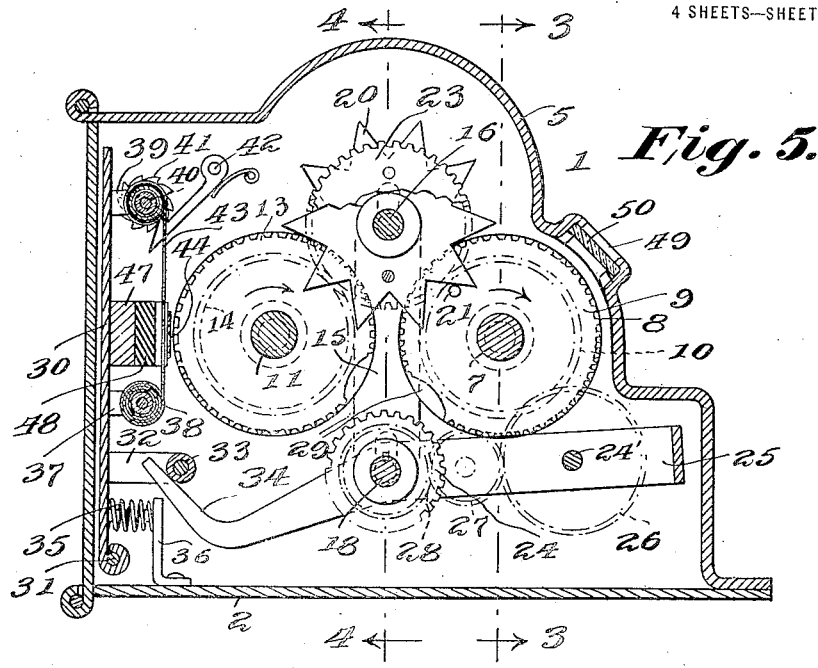
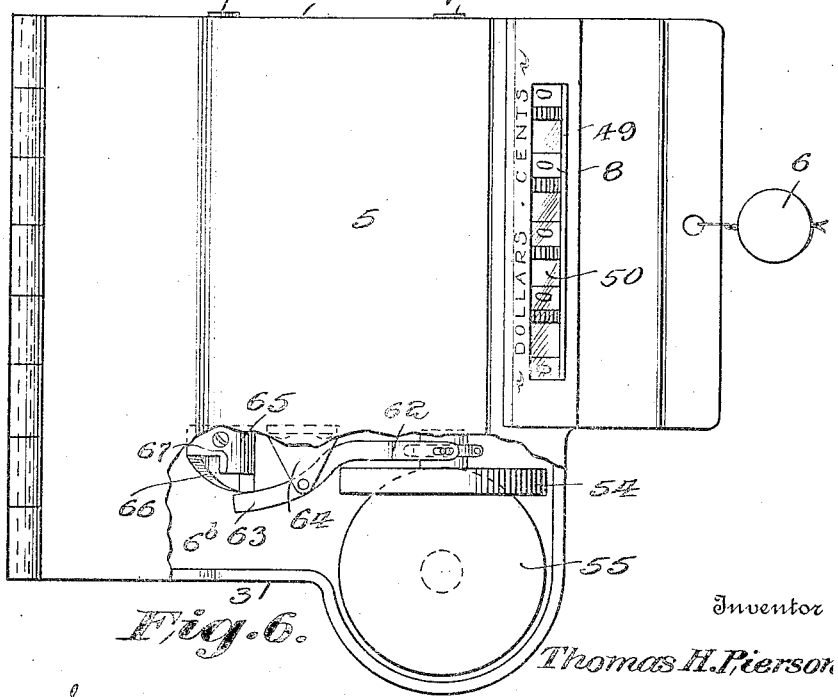

T. H. PIERSON.
METER.
APPLICATION FILED MAR. 31, 1916.
1,229,514.
Patented June 12, 1917.
4 SHEETS—SHEET 4.
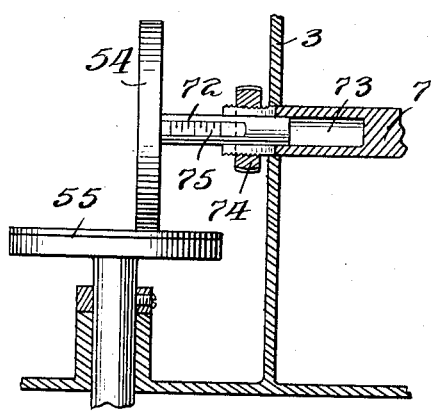
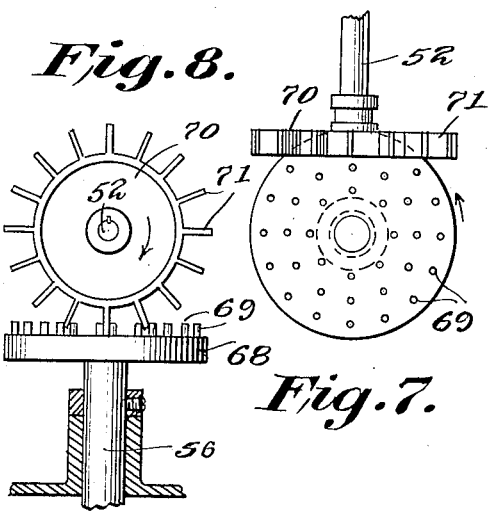
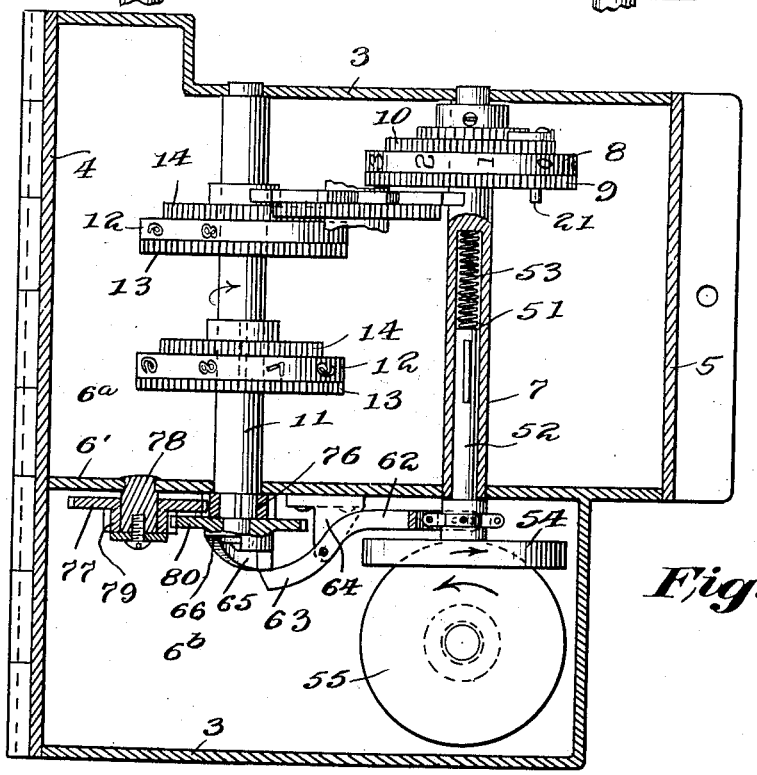
Witnesses
H. H. Lybrand
John J. McCarthy
Inventor
Thomas H. Pierson
By Victor J. Evans
Attorney

UNITED STATES PATENT OFFICE.

THOMAS HAINES PIERSON, OF NEW YORK, N. Y.

METER.

1,229,514.  Specification of Letters Patent. Patented June 12, 1917.

Application filed March 31, 1916. Serial No. 88,143.

*To all whom it may concern:*

Be it known that I, THOMAS HAINES PIERSON, a citizen of the United States, residing at New York, in the county of New York and State of New York, have invented new and useful Improvements in Meters, of which the following is a specification.

This invention relates to improvements in meters for measuring water, gas, electricity and other fluids.

In some localities, particularly where a great deal of water is used, the rate at which the water is sold changes inversely as the water is consumed. For instance, the first two thousand gallons may be sold at forty cents for each one thousand gallons, the next three thousand gallons at thirty cents for each one thousand gallons, and the next three thousand gallons for twenty cents for each one thousand gallons. Therefore, in carrying out the present invention, it is my purpose to provide means for changing the speed of the meter register mechanism relatively to the driving means of such mechanism at predetermined times in the operation of the register mechanism so that the meter register mechanism may be operated in accordance with the rates at which the water is sold. In other words, the speed of the meter register mechanism will be varied relatively to the driving means of such mechanism at a time in the operation of the register mechanism when such mechanism indicates the volume of water consumed at the current rate so that the following predetermined volume of water may be indicated on the meter at the next lower rate, the speed changing means continuing to vary the speed of the register mechanism until the water is being consumed at the lowest rate.

It is also my purpose to provide means of the class described which will be entirely automatic in operation, which will be governed by the register mechanism of the meter, and which may be applied to any type of meter.

With the above and other objects in view, the invention consists in the construction, combination and arrangement of parts hereinafter set forth in and falling within the scope of the claims.

In the accompanying drawings;

Fig. 5 is a sectional view on the line 5—5 of Fig. 2.

Fig. 6 is a top plan view of the meter, parts being broken away.

Fig. 7 is a plan view showing a modified form of driving mechanism.

Fig. 8 is a side elevation of the same.

Fig. 9 is a fragmentary longitudinal sectional view through the meter showing a further modification.

Fig. 10 is a diagrammatic horizontal sectional view through the meter showing a still further modified construction.

Figure 1:
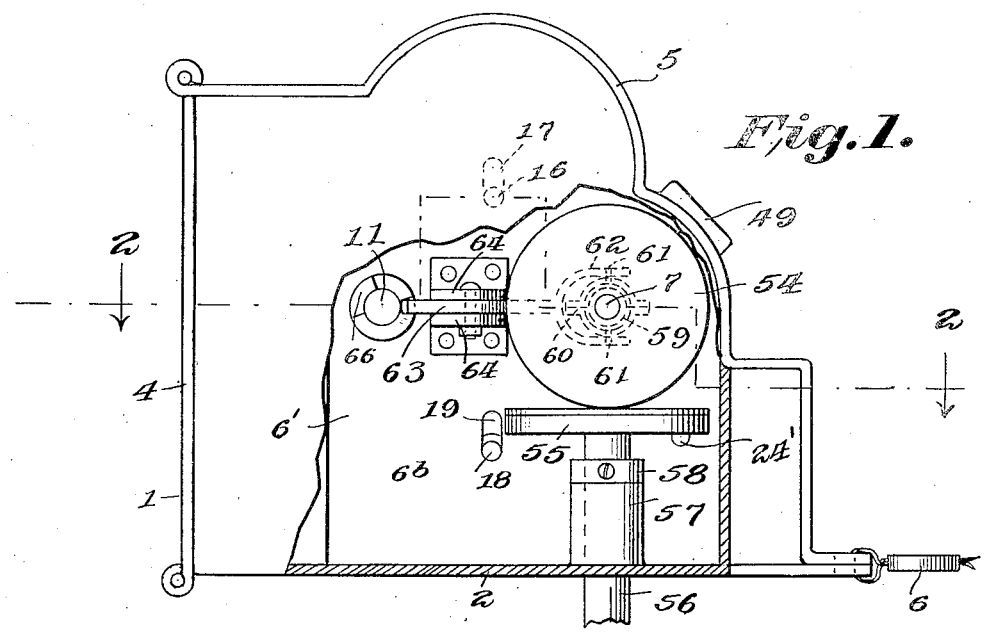
Figure 1 is a view in end elevation of a meter equipped with means constructed in accordance with my present invention, part of the casing of the meter being broken away.

In the present instance, I have shown my invention as applied to the meter covered by the pending application for Letters-Patent of Walter S. Blackmer, Serial Number 57,813 filed October 25, 1915, and in this connection I wish it to be understood that although the present embodiment of my invention is particularly designed for use in conjunction with the Blackmer meter the invention is equally applicable to meters of other types and I contemplate such changes as may be necessary to apply my invention to such other meters.

Before proceeding to the description of my invention, I will describe the meter with which the present form of my invention is associated. This particular type of meter embodies a casing 1 comprising a bottom wall 2, end walls 3, 3 upstanding from the bottom wall and suitably spaced apart and preferably, although not necessarily, formed integral with the bottom wall, a back wall 4 pivoted to the rear edge of the bottom wall and upstanding therefrom, and a section 5 forming the top and front walls of the casing and having the upper edge pivoted to the back wall and the lower end flanged and fastened to the bottom wall by means of a seal 6 or other appropriate securing device. Upstanding from the bottom wall of the casing adjacent to one of the end walls 3 is a vertical partition 6' that divides the casing into a relatively wide chamber 6ª and a narrow chamber 6ᵇ designed to accommodate the registering and recording mechanism of the meter, and my speed changing mechanism, respectively. Extending across the chamber 6ᵃ adjacent to the front side thereof and secured to the side walls of such chamber is a shaft 7 and mounted upon the shaft 7 are indicator or registering wheels 8 and each having the periphery thereof provided with an annular row of consecutive numbers. The units wheel is arranged at the right end of the shaft and is normally fixed to the shaft, while the tens wheel, the hundredths wheel, the thousandths wheel, etc., are loosely mounted upon the shaft. Secured to one side of each wheel 8 is a spur gear 9 arranged concentrically of the shaft and of a diameter approximately equal to the diameter of the indicator wheel while secured to the opposite side of each indicator wheel is a relatively small spur gear 10 arranged concentrically of the shaft. Also extending across the chamber 6ᵃ adjacent to the back wall thereof is a shaft 11 arranged parallel with the shaft 7 and having the ends thereof journaled in horizontally alining bearing openings formed in the end wall 3 and the partition 6'. Loosely mounted upon the shaft 11 are recording wheels or printing wheels 12 corresponding in number to the wheels 8 and each having the periphery thereof provided with an annular row of consecutive numbers corresponding to the numbers on the indicator wheels. Secured to one side of each printing wheel is a spur gear 13 of a diameter approximately equal to the similar dimension of the printing wheel and fastened to the opposite side of each printing wheel is a relatively small spur gear 14, the spur gears 13 and 14 being arranged concentrically of the shaft 11.

Figure 2:
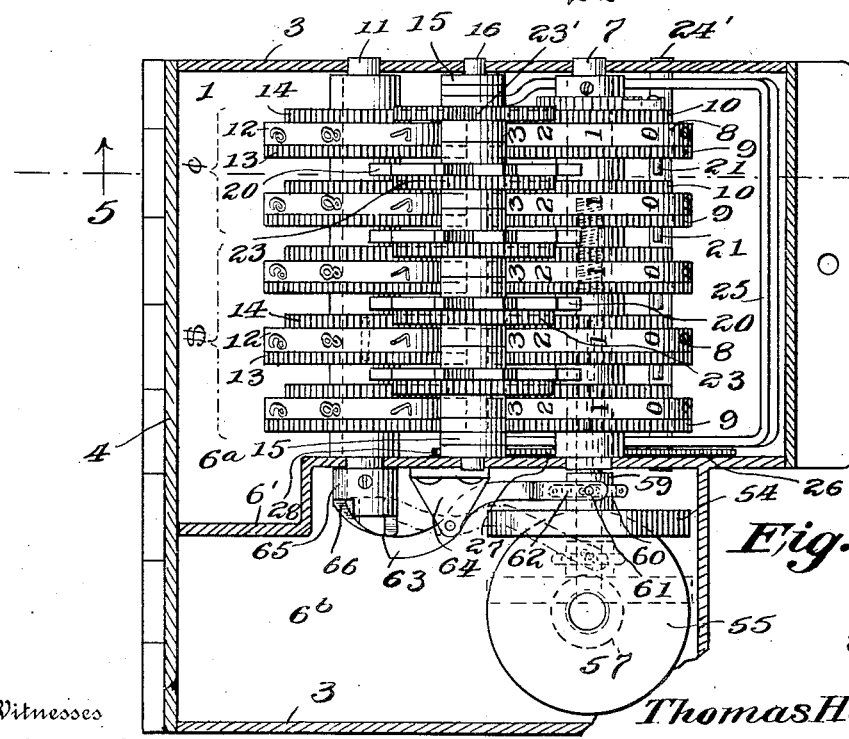
Fig. 2 is a horizontal sectional view on the line 2—2 of Fig. 1.
Figure 3:
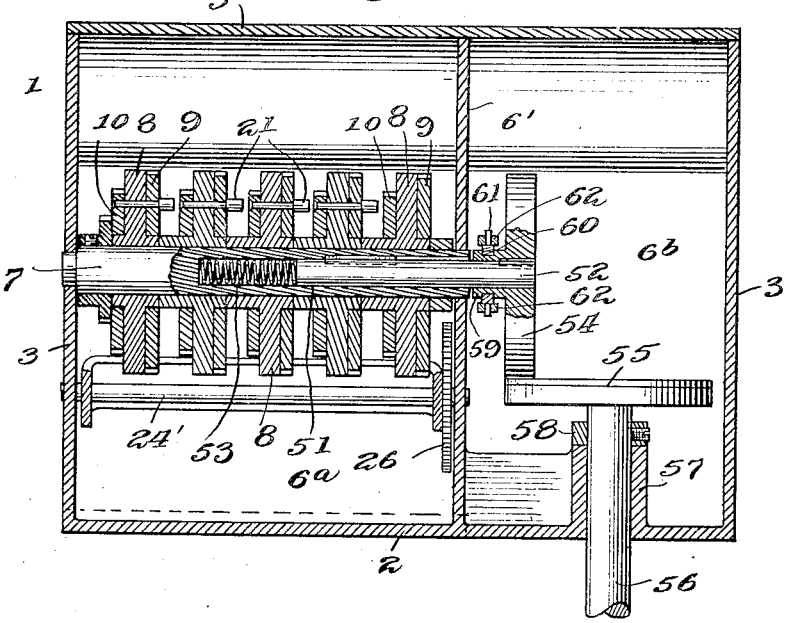
Fig. 3 is a vertical sectional view through the meter.
Figure 4:
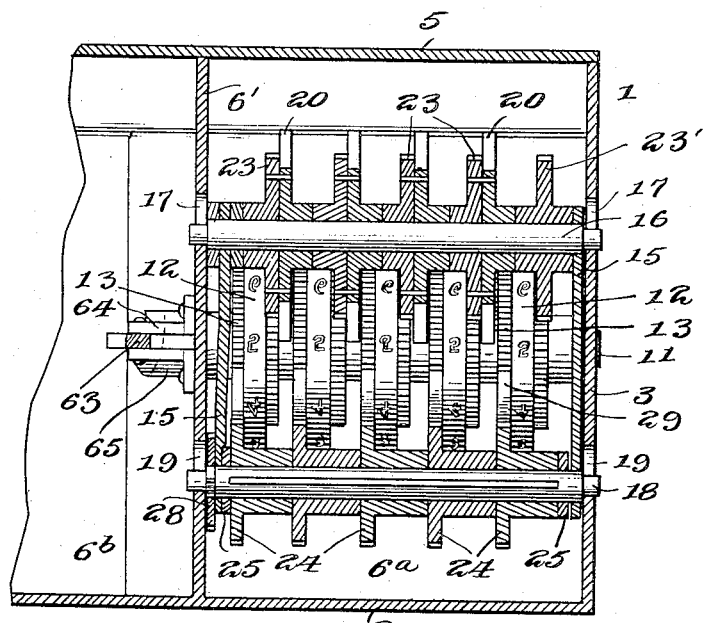
Fig. 4 is a similar view taken on a plane parallel with Fig. 3.

Arranged adjacent to the inner surfaces of the side wall 3 of the chamber 6ᵃ and the partition 6' are vertical links 15, 15 respectively, and mounted in horizontally alining openings formed in the upper ends of the links 15 is a shaft 16 having the ends thereof projecting through vertical slots 17 formed in the end wall and the partition, while mounted in horizontally alining openings formed in the lower ends of the links 15 is a shaft 18 having the ends working within vertical slots 19 formed in the end wall and the partition. The links 15 and the shafts 16 and 18 are arranged centrally of the space between the shafts 7 and 11, as clearly illustrated in Figs. 4 and 5 of the drawings, and loosely mounted upon the shaft 16 are star wheels 20 arranged between the wheels on the shafts 7 and 11 and adapted to be engaged by pins 21 carried by the respective register wheels 8. Fixed to each star wheel 20 and arranged concentrically of the shaft 16 is a spur gear 23 normally meshing with the gears 10 and 14 of the adjacent recorder and register wheels, the spur gear 23 on each star wheel meshing with the gears 10 and 14 of the adjacent recorder and register wheels opposite the register wheel carrying the pin 21 controlling the star wheel connected to such gear 23, as clearly illustrated in Fig. 2 of the drawings. Loosely mounted upon the shaft 16 and meshing with the spur gears 10 and 14 on the tens register and recorder wheels is a spur gear 23' whereby motion will be transmitted from the tens wheel in the register set to the corresponding wheel in the recorder set in order that both of such wheels will rotate synchronously. Fixed upon the lower shaft 18 are spur pinions 24 corresponding in number to the register wheels and adapted to mesh with the gears 9 and 13 carried by the register and printing wheels respectively and normally disengaged from such gears. Arranged across the chamber 6ᵃ and secured to the end wall 3 and the partition 6' and disposed adjacent to the bottom wall between the front wall and the shaft 7 is a pivot rod 24', while pivoted upon the rod 24' is a yoke 25 having the limbs thereof arranged adjacent to the end wall 3 and the partition 6' respectively and the central portion disposed adjacent to the front wall, as illustrated in Figs. 2 and 5 of the drawings. The limbs of the yoke 25 are formed with openings that receive the lower shaft 18, as shown in Fig. 4 of the drawings, so that when the central member of the yoke is depressed and the yoke swung about the rod 24' the links 15 will be elevated to disengage the star wheels and the spur gears associated therewith from the register and recording wheels and engage the spur pinions 24 with the gears 9 and 13 of the register and recording wheels, as will be understood upon reference to Fig. 5 of the drawings. Rotatably mounted upon the rod 24' adjacent to one limb of the yoke is a spur gear 26 adapted to be revolved by the thumb and finger and meshing with an idler pinion 27 mounted upon such limb of the yoke. The pinion 27 meshes with a pinion 28 keyed upon the shaft 18 at one end thereof so that when the spur gear 26 is revolved, by hand, rotary motion will be transmitted to the shaft 18. The peripheries of the spur gears 9 and 13 respectively are formed with cut-out portions 29 so that the register and recorder wheels will be uninfluenced by the gear pinions on the shaft 18 after such wheels have been restored to zero position through the medium of the pinions on the shaft 18 and the spur gear 26.

The star wheels and spur gears associated therewith constitute what may be called a transfer mechanism whereby motion may be imparted from the register wheels to the recorder wheels so that both sets of wheels will rotate in synchronism, while the pinions keyed upon the shaft 18 and the numbers associated with such shaft and pinions constitute a resetting mechanism whereby the recorder wheels and the register wheels may be restored to zero position.

Arranged behind the recorder or printing wheels is a vertical plate 30 disposed adjacent to the back wall of the casing and having the lower end thereof pivoted upon a rod 31 carried by the end wall 3 and the partition 6′ and extending across the chamber 6ª. Formed on the plate 30 at the opposite side edges thereof adjacent to the lower end and projecting outwardly from the plate are arms 32 and journaled in the outer ends of the arms 32 is a roller 33 extending across the plate. The extremities of the limbs of the yoke 25 are bent upwardly as at 34 and engage the roller 33 so that when the yoke is swung as previously described the plate 30 will be moved toward the printing wheels. In the present instance, a coiled expansion spring 35 is interposed between the plate and a bracket 36 carried by the lower wall of the casing and this spring acts to hold the plate 30 in normal position. Journaled in bracket arms 37 carried by the plate 30 is a roller 38 arranged at a point approximately centrally of the plate and extending across the latter, while journaled in bracket arms 39 carried by the plate adjacent to the upper end thereof is a roller 40 and fixed upon one end of the roller 40 is a ratchet wheel 41 normally engaged by a spring pressed dog 42 pivoted upon the adjacent end wall of the casing. Secured to the rollers 40 and 38 and wrapped thereabout are the respective end portions of a strip of paper 43 spanning the space between the rollers 40 and 38 and adapted to move toward the printing wheels with the plate 30. Extending across the paper strip 43 between the latter and the printing wheels is a printing ribbon 44 having the ends thereof secured to spools or the like. Arranged behind the paper 43 and secured to the plate 30, in line with the inking ribbon or printing ribbon 44, is a strip 47 and fastened to the face of the strip 47 immediately behind the paper is a pad 48 formed of rubber or other material. The inking ribbon 44 is arranged in juxtaposition to the printing elements on the wheels so that when the plate is swung toward the wheels the impression will be transferred to the paper.

The front portion of the section 5 of the casing is formed with a sight opening 49 extending across such section adjacent to the peripheries of the register wheels 8 and arranged within the sight opening is a transparent plate 50 formed of glass or analogous material.

The paper 43 preferably has the months of the year inscribed thereon and these names are arranged adjacent to one edge of the paper while the paper is divided transversely into columns indicative of "dollars" and "cents," and the front portion of the section 5 of the casing immediately above the sight opening is inscribed with the legends "dollars" and "cents."

The numerals on the register wheels and the printing wheels indicate "dollars" and "cents" in contradistinction to quantity and in the operation of the mechanism so far described, the shaft 7 is rotated and in the initial rotation of the shaft 7, the units register wheel is revolved and rotary motion transferred through the gear 23′ to the units wheel of the recorder wheels. As the shaft 7 continues to rotate motion is transmitted from the units wheel to the tens wheel and from the tens wheel to the hundredths wheel and so on throughout the series through the medium of the pins and star wheels, as is readily understood. In the rotation of the various wheels in the register series motion is transmitted through the medium of the spur gears 23 and the star wheels 20 to the corresponding wheels in the printing series so that the type on the printing wheels in juxtaposition to the ribbon will correspond to the numbers visible through the sight opening 49 in the front wall of the casing. When the meter inspector reads the meter through the sight opening he presses down on the interconnecting member of the yoke 25, thereby swinging the plate 30 as previously described, so that the type on the printing wheels in juxtaposition to the inking ribbon will be impressed on the paper strip, thereby forming a permanent record from time to time so that the consumer will be protected in the event of error. In the forward movement of the plate 30 under the action of the yoke the dog 42 idles over the adjacent portion of the ratchet 41, while in the backward movement of the plate, said dog rotates the ratchet wheel to advance the strip of paper to bring the name of the next month into alinement with the type on the printing wheels.

In the swinging of the yoke, the links 15 are elevated and lift the shafts 16 and 18, thereby disengaging the gear wheels and the star wheels on the shaft 16 from the register and printing wheels and engaging the pinions 24 on the shaft 18 with the gear wheels 9 and 13. In this position of the parts, the gear 26 is rotated by the hand and motion is transmitted to the shaft 18 through the pinion 27 and the pinion 28, thereby revolving the register wheels and the printing wheels to restore the same to zero position and when the various wheels reach zero position the cut-out portions 29 move into juxtaposition to the toothed surfaces of the pinions 24 so that the wheels will be relieved of the influence of such pinions. The units wheel in each set is preferably connected through the medium of pawl and ratchet mechanism, as illustrated in the drawings, so that when the shafts are driven under the action of the driving element of the meter, the units wheel will be rotated with such shafts, while when the register and printing wheels are rotated in the opposite direction, to reset the mechanism, such units wheels will idle over the shafts.

The meter mechanism so far described is covered in the application for Letters-Patent of Walter S. Blackmer, hereinbefore referred to and forms no part of my invention, but is merely shown and described in order to clearly illustrate the construction and application of my invention. My invention embraces means for transmitting motion to the shaft 7 from the driving mechanism of the meter and is capable of varying the speed of the shaft 7 relatively to the driving mechanism of the meter and, in the present instance, is under the control of the shaft 11 carrying the printing wheels and operates automatically to reduce the speed of the shaft 7 carrying the register wheels relatively to the speed of the driving mechanism of the meter at predetermined times in the operation of the register and printing wheels so that the meter register and printing wheels may be operated in accordance with the rates at which the water is sold.

In acordance with my invention, the shaft 7 is formed with a longitudinal bore 51 opening onto the end of the shaft projecting through the partition 6' and splined in the bore 51 is a shaft 52 having one end projecting into the chamber 6ᵇ and the other end in engagement with a coiled expansion spring 53 interposed between the inner end of the shaft 52 and the inner wall of the bore and acting normally to force the shaft 52 out of the bore 51. Keyed upon the end of the shaft 52 within the chamber 6ᵇ is a friction disk 54 having the periphery thereof preferably, although not necessarily, covered with leather or other suitable material and engaging the face of a friction disk 55 keyed upon the upper end of a shaft 56 journaled in a bearing sleeve 57 carried by the bottom wall of the chamber 6ᵇ. This shaft 56 projects through the bottom wall of said chamber and is adapted to be connected to the driving mechanism of the meter so that the shaft 59 will be rotated to impart a similar motion to the shaft 7 through the medium of the friction disks 55 and 54 and the shaft 52 slidably mounted within the shaft 7. The upper face of the disk 55 is preferably covered with leather or any other material. In the present instance, a thrust collar 58 encircles the shaft 56 immediately above the bearing sleeve 57 and is fastened to the shaft 56 and bears upon the bearing sleeve in order to take the thrust and hold the disk 55 in position to be effectively engaged by the periphery of the disk 54. The disk 54 is preferably formed with a laterally projecting hub flange 59 and formed in the outer circumference of the flange 59 is an annular groove in which is mounted a collar 60 provided at diametrically opposite points with radial pins 61 that engage in the slotted extremities of a yoke 62 carried by one end of a lever 63 fulcrumed between its ends upon a bracket 64 carried by the partition 6'. The end of the lever 63 remote from the yoke 62 is disposed adjacent to the end of the shaft 11 and surrounding the end of the shaft 11 and capable of adjustment circumferentially thereon is a collar 65 having the outer edge thereof formed with a cam portion 66 and stepped shoulders 67. The cam portion 66 leading from the lowermost shoulder to the uppermost shoulder. The end of the lever 63 remote from the yoke bears upon the outer edge of the collar 65 and is held in engagement therewith under the action of the spring 53.

It has been heretofore stated that the printing wheels are loosely mounted upon the shaft 11, but in accordance with my invention, any one of the printing wheels may be fixed to the shaft 11 so that when such printing wheel is revolved the shaft will be rotated and the collar 65 moved so that the collar end of the lever 63 may be forced onto the next lower shoulder under the action of the spring 53 and the disk 54 moved toward the center of the disk 55 to change the ratio of the disks so that the disk 54 will rotate at less speed than the disk 55. To illustrate, let us assume that the register wheels on the shaft 7 indicate $10.00. Owing to the connections between the register wheels and the recording wheels the recording wheels will indicate a like amount and, assuming the cam collar 65 to be set so that when the thousandths wheel moves into position to indicate $10.00, the highest shoulder on the cam will be moved from beneath the particular end of the lever 63, the spring 53 will react to swing the lever 63 and slide the friction disk 54 toward the center of the disk 55 so that the speed of the shaft 7 will be reduced. For instance, if the shoulder that releases the lever is of such a height as to allow the friction disk 54 to advance one-quarter of the distance between the original bearing point on the friction disk 55 and the center of friction disk 55, the new ratio of the disks 55 and 54 will be 1 to ¾ so that the same number of turns of the friction disk 54 as were required to register $10.00 will now register $7.50. By the variation of the number depths and distance apart of the shoulders on the collar 65, any desired changes in the rates, within the range of the meter, can be obtained.

In the modified construction shown in

Figs. 7 and 8, I have shown a positive connection between the shaft 56 and the shaft 52 in contradistinction to the friction drive just described. In this form of my invention, a disk 68 is fastened to the upper end of the shaft 56 and having the upper surface thereof formed with annular rows of pins 69 arranged concentrically of one another, and a disk 70 fastened to the shaft 52 and having the periphery thereof formed with radial teeth 71 adapted to engage the pins in any row 69, according to the position of the disk 70.

In Fig. 9 of the drawings, I have shown a manual control for sliding the disk 54 over the disk 55, as distinguished from the automatic control shown in the preferred form of my invention. In the present instance, this manual control embodies a stub shaft 72 carrying the disk 54 and slidably mounted within a bore 73 formed in the shaft 7. The outer end of the shaft 7 is split and tapered and threaded onto the tapered end of the shaft is a clamping collar 74 whereby the stub shaft 72 may be fixed in any desired position. This stub shaft 72 is preferably graduated as shown at 75 to indicate the change in speed of the disk 54 relatively to the disk 55 so that the operator can determine where to set the disk 54.

In some instance, it may be desired to reduce the speed of the collar 65 relatively to the speed of the shaft 11 and to meet such cases, I employ a suitable reducing gear that is interposed between the shaft 11 and the collar. One form of such reducing gear is shown in Fig. 10 and embodies a pinion 76 fixed upon the shaft 11 adjacent to the end thereof projecting into the chamber 6$^b$, and meshing with a relatively large spur gear 77 loosely mounted upon a stub shaft 78 carried by the partition 6'. Fixed to the gear 77 is a relatively small pinion 79 meshing with a relatively large spur gear 80 loosely mounted upon the end portion of the shaft 11, in juxtaposition to the fast pinion 76. This gear 80 carries the collar 65.

In the continued operation of the meter the shoulders on the collar release the lever at predetermined times in the operation of the meter and after the maximum number of gallons of water have been consumed at the minimum price, the cam edge 66 carries the lever and the disk 55 back to their original positions so that the cycle of operations may be repeated.

Although I have shown and described certain particular forms of driving gears as connecting the shaft 57 to the shaft 52 and the shaft 7, and described and illustrated certain particular forms of controls and actuating instrumentalities for the disks 54, I wish it to be understood that I do not limit or confine myself to the precise details of construction herein described and delineated, as modification and variation may be made within the scope of the claims without departing from the spirit of the invention.

I claim:

1. In combination, a meter register mechanism, driving means therefor, and means for changing the speed of the register mechanism relatively to the driving means at predetermined times in the operation of the register mechanism and under the control of said register mechanism.

2. In combination, a meter register mechanism, driving means therefor, and means for changing the gear ratio between said driving means and said register mechanism at predetermined times in the operation of the register mechanism and under the control of said register mechanism.

3. In combination, a meter register mechanism, and means for varying the speed of operation of said register mechanism at predetermined times in the operation of the register mechanism, and under the control of said register mechanism.

4. In combination, meter registering and recording mechanism embodying register wheels and recorder wheels, means for operating the recorder wheels synchronously with the register wheels, driving means connected to said register wheels, and means operable from one of said recorder wheels for changing the speed of said register wheels relatively to said driving means at a predetermined time in the operation of the registering and recording mechanism.

5. In combination, meter registering and recording mechanism, driving means for said mechanism, and means operable from one of said recorder wheels for changing the speed of said register and recorder wheels relatively to said driving means at a predetermined time in the operation of the registering and recording mechanism.

6. In combination, a meter register mechanism, driving means therefor, and automatic means under the control of said register mechanism operable to step down the speed of the register mechanism in a step by step manner at predetermined intervals in the operation of the register mechanism.

7. In combination, a meter registering and recording mechanism embodying register wheels and recorder wheels, means for operating the recorder wheels synchronously with the register wheels, driving disks connected to said register wheels for driving the latter from the driving means of the meter, means for shifting the driven disk automatically to change the speed of the driven disk relatively to the driving disk, and means under the influence of one of said recorder wheels and controlling said last-named means whereby said first-named means will be rendered active at a predetermined time in the operation of the registering and recording mechanism.

8. In combination, meter registering and recording mechanism embodying register wheels and recorder wheels, means for operating the recorder wheels synchronously with the register wheels, driving disks connected to said register wheels for driving the latter from the driving means of the meter, means for shifting the driven disk automatically to change the speed of the driven disk relatively to the driving disk, and a lever controlling said shifting means and under the control of one of said recorder disks whereby the speed of the driven disk may be changed relatively to the driving disk at a predetermined time in the operation of the registering and recording mechanism.

9. In combination, a meter registering and recording mechanism embodying register wheels and recorder wheels, means for operating the recorder wheels synchronously with the register wheels, driving disks connected to said register wheels for driving the latter from the driving means of the meter, means for shifting the driven disk automatically to change the speed of the driven disk relatively to the driving disk, a lever controlling said shifting means, and means adapted to be connected to any one of said recorder wheels to actuate said lever to render said shifting means active at a predetermined time in the operation of the registering and recording mechanism.

In testimony whereof I affix my signature in presence of two witnesses.

THOMAS HAINES PIERSON.

Witnesses:
ALFRED E. SMITH,
FRANCIS P. LOWREY.